C. A. WEEKS.
METHOD OF MOLDING RAIL JOINT CASTINGS.
APPLICATION FILED AUG. 25, 1909.
1,019,706.
Patented Mar. 5, 1912.
2 SHEETS—SHEET 2.
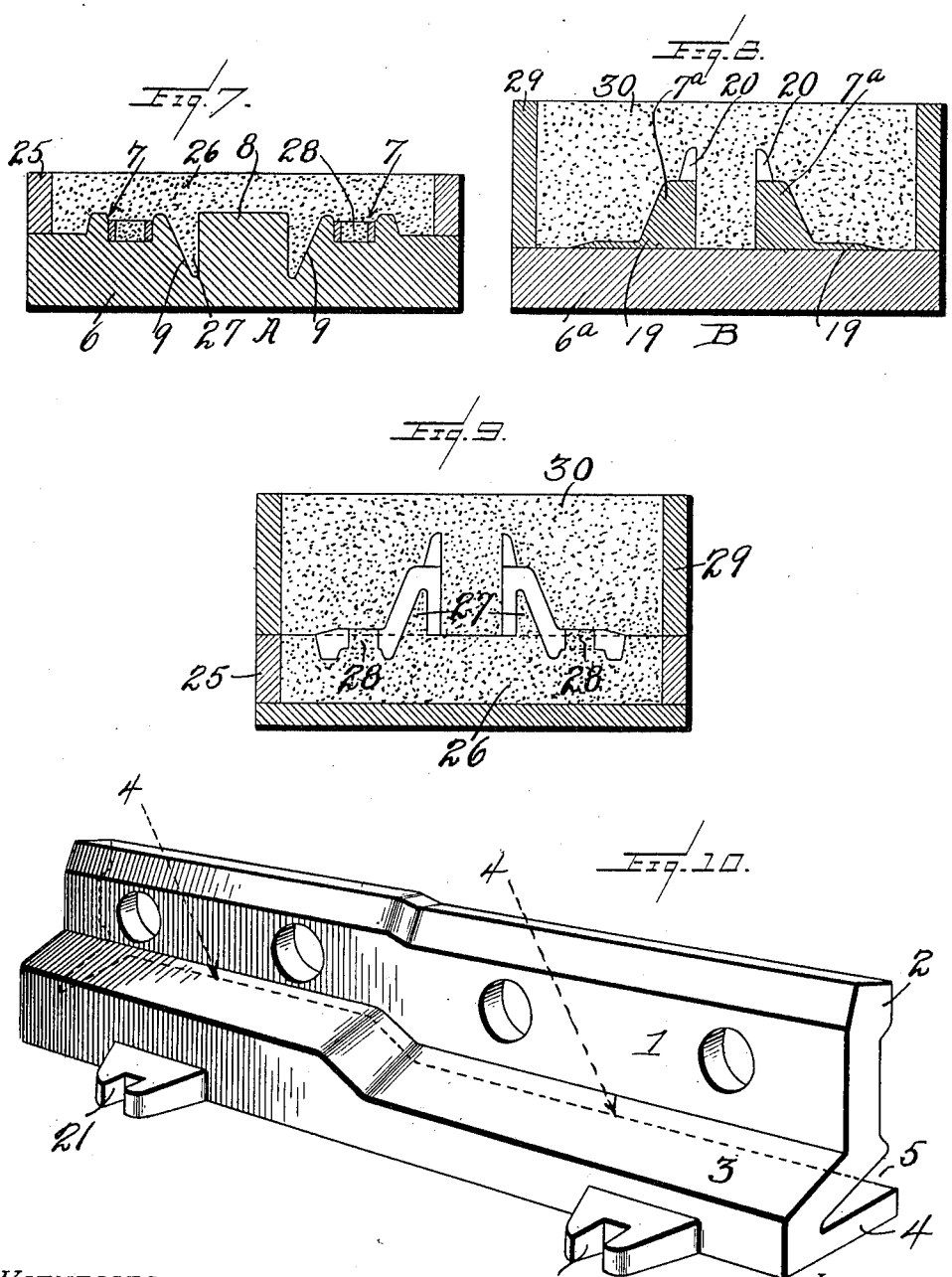
WITNESSES:
INVENTOR
Charles A. Weeks
BY
his Attorney

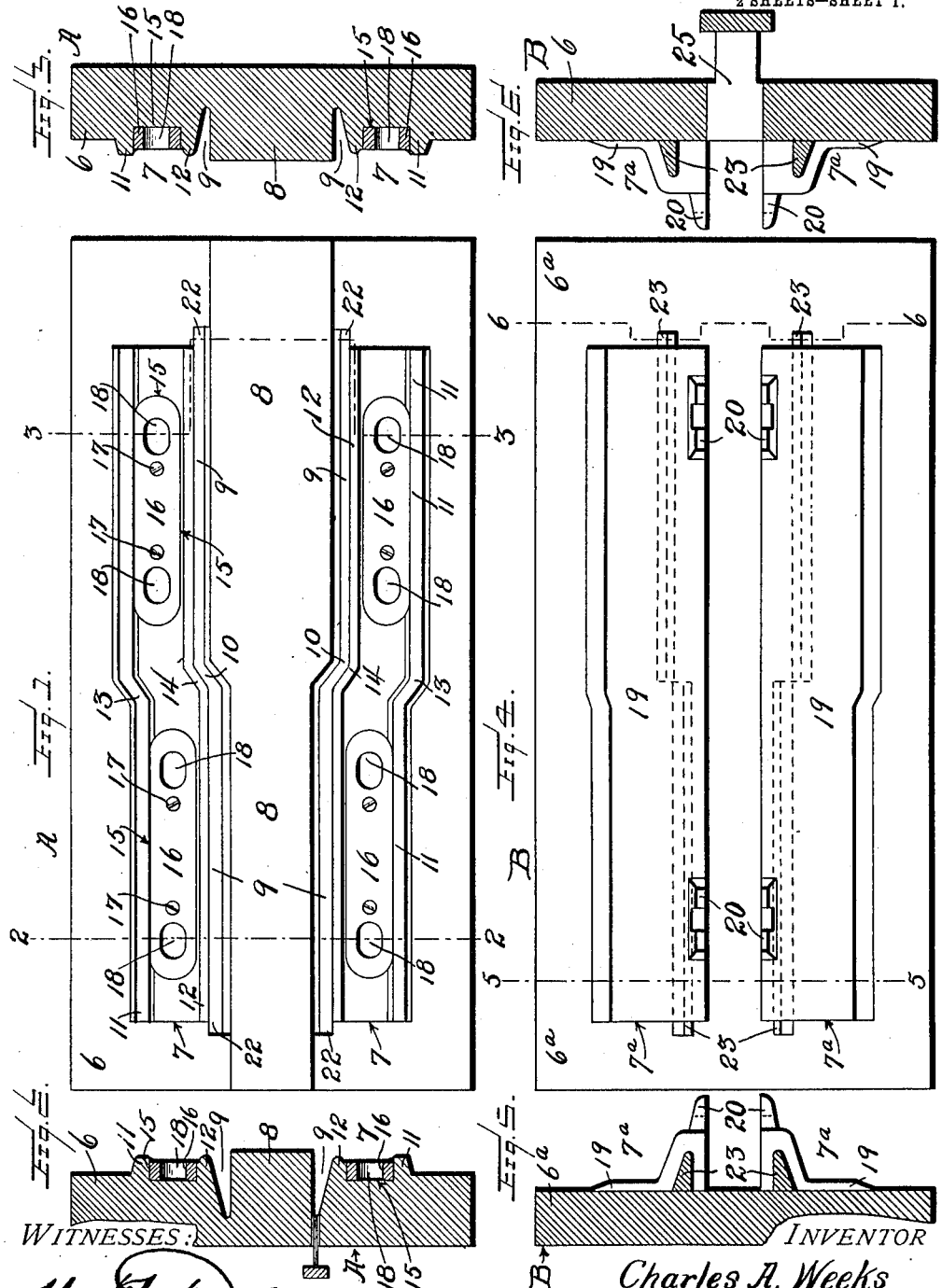

UNITED STATES PATENT OFFICE.

CHARLES A. WEEKS, OF PHILADELPHIA, PENNSYLVANIA, ASSIGNOR TO THE RAIL JOINT COMPANY, OF NEW YORK, N. Y., A CORPORATION OF NEW YORK.

METHOD OF MOLDING RAIL-JOINT CASTINGS.

1,019,706. Specification of Letters Patent. Patented Mar. 5, 1912.

Original application filed May 11, 1908, Serial No. 432,009. Divided and this application filed August 25, 1909. Serial No. 514,595.

*To all whom it may concern:*

Be it known that I, CHARLES A. WEEKS, a citizen of the United States, residing at Philadelphia, in the county of Philadelphia and State of Pennsylvania, have invented certain new and useful Improvements in Methods of Molding Rail-Joint Castings, of which the following is a specification.

This invention relates to the manufacture of rail joint castings, particularly of the type designed for use in joints of the character known as compromise or step joints, which are employed to connect rails of different heights and sections.

The ordinary methods of preparing molds for casting bars for compromise rail joints require considerable time and are more or less expensive, largely on account of involving slow hand molding and requiring skilled molders, while also not permitting the drag and cope sections of the molds to be made separately by different workmen and then assembled, as is made possible by the present invention. Also, an objection to the present way of making patterns, and preparing molds, for rail joint castings is that the patterns ordinarily employed are made in the complete form, shape, and section of the joint bar, and require the use of the follow-boards for holding the pattern and flasks in position, while the sand mold is being rammed by hand. This method does not admit of the use of power ramming and machine molding, and it is therefore one of the distinctive objects of the present invention to provide a novel and practical method of preparing molds that permits the rail joint bars to be made singly, and in multiple, through the use of power ramming and molding machines, thus materially increasing the possible output of a foundry and also reducing the cost of molding.

The invention also has in view improved means for locating the bolt hole positions of the casting at points corresponding exactly with the bolt hole positions in the rail ends to be joined by the rail joints, and in carrying out this and all of the other objects of the invention, the present application, based on the method of molding rail joint castings is a division of my application Serial No. 432,009, filed May 11, 1908, covering the design of pattern employed in the method.

In the accompanying drawings: Figure 1 is a plan view of one pattern member, constituting a half-pattern for one side of the casting. Figs. 2 and 3 are projected cross sectional views of the pattern member shown in Fig. 1 respectively on the lines of section 2—2 and 3—3 of said Fig. 1. Fig. 4 is a plan view similar to Fig. 1 of the other pattern member constituting a half-pattern of the opposite side of the rail joint casting. Figs. 5 and 6 are projected cross sectional views of the pattern member shown in Fig. 4, taken respectively on the lines of section 5—5 and 6—6 of said Fig. 4. Fig. 7 is a detail sectional view illustrative of the method of forming one face of the mold from one of the half-pattern members. Fig. 8 is a similar view illustrative of the method employed for forming the other face of the mold from the other pattern member. Fig. 9 is a sectional view of a set up sand mold prepared according to the present invention. Fig. 10 is a detail in perspective of the form of rail joint casting which can be manufactured with facility according to the method of the present invention.

Like references designate corresponding parts in the several figures of the drawings.

Referring to the specific design of casting illustrated in Fig. 10 of the drawings, and which is the product resulting from the carrying out of the present invention, it will be noted that this casting forms one of the angle bars of a compromise joint of the continuous type. This kind of joint includes a pair of these angle bars arranged in rights and lefts, and each of which bars consists of a main splice bar portion 1, a bearing head 2 at the top edge, an inclined foot flange 3 adapted to overlie the base flange of the rails, and base plate sections 4—4 formed integrally with the foot flange 3, and lying horizontally beneath said flange to form therewith an intervening flange recess 5 adapted to receive the flanges of the rails. In the design of joint bar shown, the rest faces of the base plate sections 4—4 for the separate rails are arranged in stepped relation to provide for properly supporting the differential rails.

In carrying out the invention, the pattern is made in two parts, each of which is a complete unit in the sense of being capable of being used and handled entirely independent of the other complemental unit or pattern member, thus admitting of the drag and cope sections of the mold being made separately in quantities by different workmen and then assembled. To this end, the pattern consists of two complemental parts, which are in effect half-patterns, and which, for convenience, in describing, may be referred to respectively as the inner and outer pattern members A and B. These separate pattern members A and B present patterns respectively for the opposite sides of the casting to be made, and referring in the first place to the inner pattern member A, that is, the pattern designed for the inner side of the casting, the said pattern member includes as an essential feature thereof a base plate 6 of any suitable dimensions, weight, and thickness so as to be capable of withstanding the strains of power ramming. This base plate acts in the capacity of a molding board and receives and supports thereon the flask containing the body sand of the mold, and carries as an integral, or otherwise as a rigid part thereof, a pattern form 7.

In the illustration of the invention in the drawings, the base plate 6 of the pattern member A is shown as provided with the pattern form 7 in multiple, that is, more than one of such forms, so that a plurality of rail joint castings may be provided for in the same mold. This idea may be carried out to any practical extent, but in the drawings there is suggested the provision of the pattern member A with a pair of the forms 7 disposed longitudinally of the base plate or board 6, and arranged in opposite and reversed relation at opposite sides of a central dividing strip 8 located in the center of the base plate and extending longitudinally thereof. Irrespective of the number of pattern forms 7 on the base plate 6 of the pattern member A, all of said forms are of duplicate design, so a description of one will suffice for the other. Hence, referring to each pattern form 7, it will be observed that the same provides for shaping the surface constituting the inner side of the casting, and may be said to be a female pattern form, inasmuch as the same is principally in intaglio and forms the core parts of the mold. In other words, the configuration of each female pattern form 7 corresponds to the configuration of the inner side of the casting 1, including the flange receiving recess 5 of such casting. Therefore, the shaping surface of said form 7 is provided with an angular pocket 9 corresponding to the configuration of the flange receiving recess 5 of the casting and extending longitudinally of the entire form, said pocket 9 being offset at an intermediate point, as at 10, to provide for the stepped formation of the joint bar. Also, the said form 7 includes the longitudinal shaping ribs 11 and 12 corrresponding to the conformation of the inside edges of the top and bottom of the splice bar portion 1 of the casting, said ribs 11 and 12 being also offset at an intermediate point, as at 13 and 14, to provide for the stepped formation of the joint bar.

In the plain portions of the form 7 between the spaced shaping ribs 11 and 12, the said form is recessed, as at 15, at both sides of the offset portions, to receive therein imprint core plates 16 removably held in place by suitable fasteners 17, and provided therein at predetermined points with suitably sized forming holes 18 for the core parts of the mold which provide for making the bolt holes in the castings. These removable imprint core plates 16 are interchangeable with similar plates, differing only in the position and size of the holes which locate the bolt hole positions in the mold, and thus permitting one pattern to be utilized in the manufacture of rail joint bars having bolt holes in varying positions and of different sizes.

The outer pattern member B is of the same structural formation as the pattern member A in the particulars of the base plate or molding board and the arrangement of the pattern forms singly or in multiple. Hence, the outer pattern member B includes in its construction a base plate 6ª and a pattern form or forms 7ª formed integrally, or otherwise rigidly, with the body of the base plate or board. Each pattern form 7ª of the outer pattern member may be said to be a male pattern form inasmuch as the same is almost entirely in relief, and provides for shaping the surface constituting the outer side of the casting. Therefore, the shaping surface of the form 7ª includes a pattern projection 19 having the configurations of the outside surface of the joint bar, that is, the configuration of the outside surfaces of the elements 1, 2, 3, and 4 of the casting, and said pattern projection also preferably includes offstanding forming bosses 20 having the configuration of the spiking lugs 21 at the outside bottom corner of the bar casting as shown in Fig. 10.

A further feature of the invention resides in the provision of the separate members of the patern with means whereby the drag and cope sections of the mold can be centered. This may be accomplished by constructing the pattern member A at the ends of the forms 7 with lug forming prints 22, and the pattern member B with corresponding and complemental socket forming prints 23, the lugs formed on the sand by the prints 22 matching and engaging in sockets or depressions formed in the sand by the prints 23. Also, the invention includes, as a detail thereof, the use of a push out, 24, slidably mounted in an opening provided therefor in the base plate 6 in the plane of the pocket 9 so as to engage the sand core of high projection formed in such pocket and thus facilitate the drawing of the sand mold from the pattern member A. A similar push out 25, with corresponding functions, may be mounted to work through the base plate 6ª to ease the withdrawal of the core left between the two forms 7ª. These push outs have sufficient movement to support the core faces until entirely clear of the pattern, but are only required where the draw of core is extreme. In general work they may be dispensed with, as the ordinary draft of the patterns will be sufficient to allow the mold to come from the pattern clear and perfect.

From the foregoing description, it will be observed that in the pattern member B, provision is made for the stepped formation of the casting by a differential thickness in the bottom portions of the opposite parts of the forms 7ª as plainly shown in Figs. 5 and 6 of the drawings.

In forming the mold from the patterns herein described, it may be assumed that the flask 25 of the drag section of the sand mold is arranged upon the base 6 carrying the forms 7 and the body sand 26 in said flask rammed on said forms to shape one face of the mold and also to make the sand core portions 27 and 28 respectively for the flange receiving recess 5 of the casting and for the bolt holes. As an entirely separate operation by other workmen, the flask 29 of the cope section of the mold is arranged upon the base 6ª carrying the forms 7ª and the body sand 30 of said cope section rammed on said forms to shape the other face of the mold. This operation is carried on to any extent desired to shape up quantities of the drag and cope sections, and the complete mold is subsequently formed by simply assembling said drag and cope sections with the opposing mold faces in registration, as shown in Fig. 9.

I claim:

The herein described method of preparing molds for rail joint bars consisting in separately and independently forming, by power ramming, the drag and cope sections of a sand mold from two complemental pattern forms having respectively the configuration of the outside and inside of the same rail joint bar, and, during the formation of one of said sections in producing from the body sand thereof, in variable positions and sizes, sand core projections for the bolt holes of the casting, and then assembling in superposed relation the said two mold sections.

In testimony whereof I hereunto affix my signature in the presence of two witnesses.

CHARLES A. WEEKS.

Witnesses:
　PRESCOTT A. HOPKINS,
　THOMAS L. HODGE.

---

Copies of this patent may be obtained for five cents each, by addressing the "Commissioner of Patents, Washington, D. C."